(12) United States Patent  (10) Patent No.: US 12,163,591 B2
Rosen  (45) Date of Patent: Dec. 10, 2024

(54) SEAL ELEMENT FOR A PIPELINE PIG

(71) Applicant: ROSEN SWISS AG, Stans (CH)

(72) Inventor: Patrik Rosen, Meppen (DE)

(73) Assignee: ROSEN SWISS AG, Stans (CH)

( * ) Notice: Subject to any disclaimer, the term of this patent is extended or adjusted under 35 U.S.C. 154(b) by 0 days.

(21) Appl. No.: 17/613,410

(22) PCT Filed: May 20, 2020

(86) PCT No.: PCT/EP2020/064198
§ 371 (c)(1),
(2) Date: Nov. 22, 2021

(87) PCT Pub. No.: WO2020/234418
PCT Pub. Date: Nov. 26, 2020

(65) Prior Publication Data
US 2024/0200664 A1  Jun. 20, 2024

(30) Foreign Application Priority Data
May 20, 2019 (DE) ...................... 10 2019 113 382.3

(51) Int. Cl.
F16J 15/46 (2006.01)
F16J 15/322 (2016.01)
F16L 55/40 (2006.01)
F16L 55/48 (2006.01)
F16L 101/12 (2006.01)
F16L 101/30 (2006.01)
G01N 23/223 (2006.01)

(52) U.S. Cl.
CPC ............. F16J 15/46 (2013.01); F16J 15/322 (2013.01); F16L 55/40 (2013.01); F16L 55/48 (2013.01); F16L 2101/12 (2013.01); F16L 2101/30 (2013.01); G01N 23/223 (2013.01); G01N 2223/3303 (2013.01); G01N 2223/628 (2013.01)

(58) Field of Classification Search
CPC . F16J 15/46; F16J 15/322; F16L 55/40; F16L 55/48; F16L 2101/12; F16L 2101/30; G01N 23/223; G01N 2223/3303; G01N 2223/628
USPC .................. 137/551; 277/335, 331, 605, 645
See application file for complete search history.

(56) References Cited

U.S. PATENT DOCUMENTS 3,593,749 A * 7/1971 Reardon ............... F16L 55/136
138/93
3,689,082 A * 9/1972 Satterthwaite et al. . F16J 15/46
277/516

(Continued)

FOREIGN PATENT DOCUMENTS

DE   102015106333 A1   10/2016
DE   202016106843 U1   1/2017

(Continued)

Primary Examiner — Minh Q Le
(74) Attorney, Agent, or Firm — Husch Blackwell LLP

(57) ABSTRACT

A seal element is provided for a pipeline pig, which is transferable from a propulsion position into a sealing position. T in which the seal element presses against an inside of a pipeline wall. The seal element has at least one preferably ring-shaped hollow body, which can be filled with fluid and emptied. The seal element is transferable between propulsion position and sealing position.

12 Claims, 11 Drawing Sheets

(56) References Cited

U.S. PATENT DOCUMENTS

| | | | | |
|---|---|---|---|---|
| 3,731,525 A * | 5/1973 | Suter | | G01M 3/2846 |
| | | | | 73/49.5 |
| 4,045,035 A * | 8/1977 | Lecordier | | F16J 15/008 |
| | | | | 277/606 |
| 4,084,933 A * | 4/1978 | Reitemeyer | | B29C 48/9115 |
| | | | | 425/467 |
| 4,086,806 A | 5/1978 | Covey, III et al. | | |
| 4,144,908 A * | 3/1979 | Dunn | | F16L 55/134 |
| | | | | 138/93 |
| 4,180,272 A * | 12/1979 | Heitz | | B65B 39/001 |
| | | | | 141/312 |
| 4,227,702 A * | 10/1980 | Thate | | F16J 15/46 |
| | | | | 378/33 |
| 4,342,336 A | 8/1982 | Satterthwaite et al. | | |
| 4,426,086 A * | 1/1984 | Fournie | | G01M 3/022 |
| | | | | 277/572 |
| 4,840,191 A * | 6/1989 | Gausman | | F16K 1/12 |
| | | | | 251/5 |
| 5,079,997 A * | 1/1992 | Hong | | F15B 15/262 |
| | | | | 92/185 |
| 5,208,936 A | 5/1993 | Campbell | | |
| 5,209,266 A * | 5/1993 | Hiemsoth | | F16L 55/1283 |
| | | | | 138/93 |
| 5,341,726 A * | 8/1994 | Watson | | B65D 88/60 |
| | | | | 277/467 |
| 5,342,065 A * | 8/1994 | Blanke | | F16J 15/46 |
| | | | | 277/389 |
| 5,580,068 A * | 12/1996 | Gundy | | F16J 15/022 |
| | | | | 277/615 |
| 7,419,132 B2 * | 9/2008 | McCausland | | F16K 7/10 |
| | | | | 251/5 |
| 8,858,732 B1 | 10/2014 | Al Qanaei | | |
| 2002/0113379 A1 * | 8/2002 | Giebel | | E06B 9/00 |
| | | | | 277/646 |
| 2004/0000400 A1 * | 1/2004 | Fujisawa | | E21B 49/005 |
| | | | | 166/264 |
| 2004/0064979 A1 * | 4/2004 | Smith | | G01M 3/38 |
| | | | | 37/413 |
| 2009/0295099 A1 | 12/2009 | Hassen | | |
| 2010/0162503 A1 * | 7/2010 | Rosen | | B08B 9/035 |
| | | | | 15/104.061 |
| 2012/0126492 A1 * | 5/2012 | Cordua | | F16J 15/0825 |
| | | | | 277/605 |
| 2014/0078499 A1 | 3/2014 | Abney et al. | | |
| 2015/0176404 A1 * | 6/2015 | Smith | | E21B 25/18 |
| | | | | 324/345 |
| 2015/0268178 A1 * | 9/2015 | Smith | | G01N 23/222 |
| | | | | 250/253 |
| 2016/0031638 A1 * | 2/2016 | Noyon | | F16L 55/136 |
| | | | | 220/315 |
| 2016/0273992 A1 * | 9/2016 | Frueh | | F16L 55/40 |
| 2016/0310998 A1 * | 10/2016 | Hailey | | B08B 9/0557 |
| 2017/0138524 A1 * | 5/2017 | El-Sheimy | | G01C 21/165 |
| 2019/0079031 A1 * | 3/2019 | Safai | | G01N 29/043 |
| 2019/0226625 A1 * | 7/2019 | Grote | | B08B 9/0557 |
| 2022/0317064 A1 * | 10/2022 | Kong | | G01T 1/2014 |
| 2022/0317070 A1 * | 10/2022 | Rosen | | B08B 9/0551 |

FOREIGN PATENT DOCUMENTS

| | | |
|---|---|---|
| FR | 2311981 A1 | 12/1976 |
| GB | 2555120 A | 4/2018 |

\* cited by examiner

SEAL ELEMENT FOR A PIPELINE PIG

CROSS REFERENCE

This application claims priority to PCT Application No. PCT/EP2020/064198, filed May 20, 2020, which itself claims priority to German Patent Application No. 10 2019 113382.3, filed May 20, 2019, the entirety of both of which are hereby incorporated by reference.

FIELD OF THE INVENTION

The invention relates to a seal element for a pipeline pig, which is designed for contact on a pipeline wall. The invention furthermore relates to a pig having a corresponding seal element. Seal elements for pipeline pigs are known. These are typically manufactured using an elastomeric material such as polyurethane. When used on a pig, the seal elements press against the inside of a pipeline wall.

BACKGROUND OF THE INVENTION

Typical seal elements have a larger external diameter than the internal diameter of the respective pipeline. The seal elements accordingly press against the pipeline wall when used on a corresponding pig. The contact pressure between the pipeline wall and the seal element connected thereto is thus a function of the material of the seal element and the respective geometry, in particular of the outer circumference of the seal element and the internal diameter of the pipeline.

Pigs which have seal elements having a variable circumference are known. Thus, US 2019/0107239 discloses a pig in which a core made of an elastomer can be compressed by mechanical elements arranged on both sides of the core and can be moved outward in the radial direction.

BRIEF SUMMARY OF THE INVENTION

The object of the present invention is to provide alternative seal elements which, when they are used on a pig, are movable on the pipeline wall and/or in which the contact pressure on the pipeline wall is adaptable. Furthermore, it is the object of the invention to provide a pig which has corresponding alternative seal elements.

In a seal element according to the invention, the seal element does not have to be permanently connected to the pipeline wall. The seal element can be transferred between a seal position, in which it presses with high contact pressure against the inside of a pipeline, and a propulsion position, in which it does not press or only presses with a lesser contact pressure against the inside of the pipeline. The geometry of the seal element can be changed so that it can be brought into contact with the pipeline wall and/or the contact pressure of the seal element on the pipeline wall is changeable. A seal element according to the invention has at least one hollow body, which is in particular ring-shaped, for this purpose, which can be filled with a fluid and emptied. The hollow body can be arranged on or in the seal element and/or formed thereby for this purpose. A seal element having an introduced hollow body can be manufactured in a simple manner in that the seal element, or at least an elastic section thereof, is cast around the hollow body, for example a hose. The hollow body can also be arranged on the elastic section of the seal element. The elastic section of the seal element can also be formed by the hollow body. The section is elastic if the material used there or the design used there enables a change of the diameter of the seal element by at least 1%, preferably 3%. The hollow body can be filled with a fluid, whereby a force is exerted on a seal surface of the seal element, that is to say the surface of the seal element which is in contact with a pipeline wall upon use on a pipeline pig. The contact pressure of the seal element on the pipeline wall can thus be set by the setting of the pressure of the fluid in the hollow body. Furthermore, it is conceivable that the seal element is first brought into contact with the pipeline wall by the filling of the hollow body with a fluid.

In one refinement of the invention, the seal element is formed as a seal cup having a seal region, in particular in the form of a truncated cone, wherein the seal region is designed for the purpose of being brought into contact with an inside of a pipeline and wherein a hollow body, which is in particular ring-shaped, is arranged on the seal region. This refinement accordingly supplements a conventional seal cup with such a hollow body. This can be filled with fluid and emptied and causes a movement of the seal region in the radial direction of the seal cup and/or a strengthening of the contact pressure of the seal region in relation to the pipeline wall when a corresponding seal element is used on a pipeline pig.

In an alternative embodiment, the hollow body, which is ring-shaped in particular, is introduced into a seal region, which is in particular in the form of a truncated cone, of the seal cup and/or is formed by an elastic section of the seal region. This requires a modification of the typical production of a seal cup. This is possibly less simple to manufacture due to the introduction of the hollow body. Filling and emptying the hollow body with a fluid can be carried out by a line extending in the interior of the seal cup. A seal element designed in this way in the form of a seal cup is thus less susceptible to malfunction and more reliable.

In an alternative preferred embodiment, the seal element is designed as a guide disk, which is in particular ring-shaped. A guide disk can be used independently of the installation direction on a pig.

In one embodiment, the guide disk has a circumferential groove on the outer circumference, in which an elastic hollow body, which is ring-shaped in particular, is at least partially arranged. When the hollow body is filled with fluid, a lateral expansion of the hollow body is restricted by the arrangement in the circumferential groove. The elastic hollow body can thus only expand outward beyond the circumference of the guide disk. In this case, the elastic hollow body comes into contact with the pipeline wall when it is used on a pipeline pig. The amount of fluid required for the expansion is limited due to the directed expansion of the elastic hollow body. Moreover, the elastic hollow body is more simply accessible and can be replaced more easily. The guide disk preferably has at least one metallic groove body which at least partially encloses the groove. In this way, the groove is reinforced and the space for the expansion of the elastic hollow body in the guide disk is limited, in particular if it is manufactured from an elastomeric material such as polyurethane.

The guide disk can also have multiple grooves and multiple elastic hollow bodies, which are also only arranged in sections on the circumference of the guide disk. The guide disk can therefore have a plurality of segments, in particular 4, 6, 8, 10, or more segments, with each of which an elastic hollow body is associated. This is advantageous in particular in combination with metallic groove bodies. The elastic hollow bodies of the individual segments can be filled individually and differently. In this way, the contact pressure on the pipeline wall can be controlled segment by segment. Moreover, in the event of damage of an elastic hollow body of one segment, the elastic hollow bodies of the other segments can still be brought into contact on the pipeline wall. Such a seal element is therefore more reliable. Furthermore, the maintenance and/or repair is facilitated, since only the damaged elastic hollow body has to be replaced.

In an alternative embodiment, the hollow body, which is ring-shaped in particular, is arranged in an elastic section of the guide disk or is formed thereby. The outer circumference of the guide disk is displaced outward in the radial direction by the filling of the cavity in the hollow body with fluid, until this outer circumference comes into contact with a pipeline wall and/or the contact pressure of the guide disk on the pipeline wall is increased. Such a guide disk is less susceptible to damage in that the cavity or a hollow body having the cavity is embedded in the guide disk.

The guide disk preferably has a trapezoidal cross section. In this case, the thickness of the guide disk decreases outward in the radial direction. The stability of the guide disk is increased in this way with equal material use or the material use is reduced for a similarly stable guide disk. This relates both to the stability with respect to deformations as a pig equipped with a corresponding guide disk is guided through a pipeline and also with respect to an increase of the contact pressure of the guide disk on the pipeline. Therefore, higher contact pressures can be implemented using such a guide disk with equal material use.

The guide disk preferably has a seal section which is at least also formed by a bead protruding on the outer circumference beyond the side wall of the guide disk, wherein the seal section and the hollow body, which is ring-shaped in particular, are arranged in such a way that the seal section is movable radially outward by filling the hollow body with a fluid. A seal section in the form of a circumferential bead formed on the guide disk forms a wear pad of the seal element. Such a seal element can be used for a longer time period and increases the usage duration if the seal element is also used for braking a pig in the pipeline and not exclusively for sealing purposes.

The guide disk particularly preferably has two beads arranged extending opposite to one another on the outer circumference of the guide disk, which protrude beyond a respective side wall of the guide disk and each at least partially form a seal section, and two hollow bodies, which are in particular ring-shaped, wherein the hollow bodies can be filled independently of one another and arranged so that the seal sections are each movable radially outward independently of one another by filling a respective hollow body. A seal element which has two different seal sections which can be brought into contact on a pipeline inner wall using two hollow bodies independent of one another and/or the respective contact pressure of which can be regulated independently of one another increases the reliability of the corresponding seal disk. It is thus conceivable to use the other seal section upon failure of one seal section of a guide disk. It is furthermore conceivable to arrange the two seal sections spaced apart from one another in the movement direction of a pig provided with a corresponding guide disk in the movement direction of the pig in a pipeline. The corresponding seal sections can therefore either be used simultaneously or as a double seal or can be used depending on the movement direction of the pig in the pipeline or depending on the installation direction of the guide disk on a pig. Such a guide disk is thus usable independently of the movement direction or independently of the installation direction.

The seal element preferably has two sections made of polyurethane of different hardness, wherein the seal element, when it is used on a pig, can be brought into contact with the pipeline wall at least with the section formed from a polyurethane of lesser hardness, wherein the section made of polyurethane of lesser hardness extends in particular over the entire circumference of the seal element. A good sealing action of the seal element with the pipeline can be achieved in this way, even if the pipeline wall is negatively affected in particular by damage such as corrosion and does not have a completely round cross section. At the same time, the stability of the seal element is ensured by the section made of polyurethane of greater hardness.

The seal element preferably has at least one metal rod which can be brought into contact on the pipeline wall when it is used on a pig. The metal rod preferably has a rough surface. The seal element particularly preferably has multiple metal rods spaced apart from one another in the circumferential direction. The friction of the seal element upon contact on the pipeline wall is increased in this way.

Furthermore, a pig having a pig body, having at least one seal element according to the invention, and a fluid line arrangement comprising a fluid pump, via which the hollow body, which is ring-shaped in particular, of the seal element can be filled with a fluid, is the subject matter of the invention. Such a pig is designed to fill the seal elements by applying a fluid to the hollow body. The medium flowing through the pipeline, for example, natural gas, petroleum or petroleum products, or water is preferably used for the fluid to be filled. Alternatively, the pig can also have a corresponding storage compartment for such a fluid, from which the fluid is transferred into the hollow body of the seal element. The fluid can also be a gas-liquid mixture, whereby the use with a storage compartment is simplified.

The pig preferably has at least one first seal element, which is arranged adjacent to a first end of the pig body, and at least one second seal element, which is arranged adjacent to a second end of the pig body. The two seal elements are thus arranged spaced apart from one another in the movement direction of a pig through a pipeline. Respective groups of seal elements, for example one seal element in the form of a guide disk and a second seal element in the form of a seal cup, which are arranged one directly behind the other, can also be provided. These seal elements can also contribute to fixing the location of the pig body in the pipe cross section, which prevents the pig body from being able to come into contact with the pipeline wall.

Such a pig can have means for pumping the region between the first and the second seal element empty, to provide the option there of processing the pipeline. In this case, the internal pressure in the pipeline or the pressure difference over the bypass of the repair pig arranged in the pipeline can be used to assist the pumping empty. A Venturi nozzle in the bypass can be used in particular for this purpose. Alternatively or additionally, the pig can also have means, by which the kinetic energy of a fluid flowing in the pipeline due to the pressure difference can be used, such as a turbine or a propeller, in particular as an impeller arranged in the bypass. The kinetic energy of the flowing fluid can be converted into mechanical and/or electrical energy by this means and can be provided for the operation of the repair pig, in particular for the operation of a pump for pumping empty a region (located in the pipeline) of the pipeline on the inner wall side preferably located radially outward from the bypass.

The pig particularly preferably has a container having a flushing fluid, in particular a pressurized gas, using which the region between the first and the second seal element can be flushed. For this purpose, the pig furthermore has at least one flushing valve, which is arranged in the pig body and/or in at least one of the seal elements. A medium possibly located between the first and the second seal element is at least partially displaced out of this space in this way. A suitable, in particular secure environment for possible cleaning, maintenance, and/or inspection work can thus be provided in this region. Material can be applied to the pipeline wall in a region flushed in such a way, in particular by buildup welding or the application of plastics such as patches made of fiber-reinforced plastic or uncured plastics. In this way a coating can be applied to a pipeline or repaired. The material to be applied to the inside of the pipeline can also be used for this purpose as a flushing fluid. The fluid pump of the pig is preferably a liquid pump and the fluid is a preferably incompressible liquid. The use of a liquid pump and a liquid as a fluid facilitates the handling of the fluid which has to be introduced into the hollow body of the seal element. No or hardly any additional volume thus has to be introduced into the hollow body for the pressure increase. The contact pressure on a pipeline wall can thus be regulated in a particularly simple manner.

A pig according to the invention preferably has a position determination unit for positioning the pig in the pipeline. If the seal elements are to be used as brake elements or part of a brake device, the position of the pig in the pipeline can be determined via the position determination unit and thus a brake unit or a seal element can be used for braking the pig in the pipeline at a desired point. The pig can thus be fixed at a specific point in the pipeline or the pig speed can be reduced for traversing a specific section of the pipeline.

The position determination unit preferably comprises an odometer, a weld seam detection arrangement, and/or a signal receiver for positioning signals transmitted through the pipeline wall. The position can be determined as a function of the distance covered in the pipeline by an odometer. A weld seam detection arrangement detects the circumferential weld seams, using which individual sections of the pipeline are connected. In oil or gas pipelines, for example, these individual sections or the weld seams thereof are recorded in the documentation of the pipeline, so that the pipe can determine by counting the traversed circumferential weld seams in which section of the pipeline it is located. Therefore, via such a position determination unit having weld seam detection, the pipe can be slowed or stopped, for example, in a specific pipeline section if cleaning, maintenance, and/or inspection work is to be carried out there. A signal receiver for positioning signals transmitted through the pipeline wall can either detect transmitters for guide signals attached to the pipeline wall and determine its position in the pipeline via this or can be prompted to brake or stop at a specific point inside the pipeline by a corresponding stop signal transmitted through the pipeline wall.

A pig preferably comprises a bypass system having a bypass valve, through which a fluid flowing in the pipeline can be conducted through the pig and/or past the pig. A pig is typically transported through the pipeline by the fluid flowing in the pipeline. If a seal element of a pig according to the invention is to brake the pig on a pipeline wall or bring it to a stop, the flow speed of the fluid in the pipeline has to be regulated accordingly, since otherwise an increasing differential pressure would be built up between both ends of the pig, which would possibly exceed the retention force of the seal element on the pipeline and would result in damage to the seal element, the pipeline, and/or the pig. To reduce the required forces for fixing the pig in a pipeline or for braking the pig to a specific speed, a part of the fluid can be guided past the pig or through the pig via a corresponding bypass system. The buildup of a differential pressure over the pig in the pipeline is thus reduced. Furthermore, this has the advantage that during the use of the pig, the pipeline can still transport fluid even if this pig slowed or stopped at a specific point. The operation of the pipeline is thus disturbed less. This also represents a significant cost advantage upon the use in oil and gas pipelines upon the use of a corresponding pig if the operation of the pipeline does not have to be restricted or only has to be slightly restricted.

The bypass valve of a bypass system is preferably designed so that it is subjected to a force moving the bypass valve in the direction of a closed position by a fluid flowing in the pipeline. The bypass valve is opened by a motorized drive against the force exerted by the fluid. One advantage of such an arrangement is that the bypass valve thus closes automatically when a power source of the pig is exhausted and/or a malfunction of the power supply or the motorized drive of the bypass valve occurs. The bypass valve closes and the pig is moved by the action of the fluid flowing in the pipeline through the pipeline until it can be removed from the pipeline at a removal point. A bypass system having a correspondingly designed bypass valve thus increases the operational reliability of a corresponding pig, which is reliably removed from the pipeline in the event of a malfunction.

The bypass valve is particularly preferably pivotably mounted and formed asymmetrically around the pivot axis. The bypass valve is arranged on the pig here so that the section of the bypass valve having the larger area can be subjected to a force moving the bypass valve in the direction of the closed position by a fluid flowing in the pipeline. This is a simple possibility for designing a bypass valve closing automatically under the action of the fluid flowing in the pipeline.

The pig preferably has maintenance, cleaning, and/or inspection means. A pig equipped with maintenance, cleaning, and/or inspection means can carry out maintenance, cleaning, and/or inspection work. Inspection means comprise in particular sensors, preferably for nondestructive measurement methods. Cleaning means comprise brushes in particular. Maintenance means comprise in particular welding devices, drills, grinders, manipulators, and applicators, in particular for adhesives, patches made of fiber reinforced plastic, and artificial resins. A pig provided with such maintenance means can carry out repair work such as the repair of a coating in the interior of the pipeline. The speed and/or position of the pig in the pipeline can be precisely fixed and/or maintained by the seal elements according to the invention, possibly assisted by a bypass.

The pig preferably has an x-ray fluorescence sensor. Inspection pigs having different sensors for in-line inspection of pipelines, in particular oil and gas pipelines, are known in the prior art. These sensors are equipped here to carry out measurements while they are guided past on the pipeline wall. The material composition of the pipeline can be determined by means of such an x-ray fluorescence sensor. This can be used to determine the types of steel used in a specific section in a pipeline. This is of interest in particular for oil and gas pipelines, both in old pipelines, in which there is uncertainty with respect to the documentation, and also in newly laid pipelines, in which the respective installed steel qualities can be checked and thus the documentation can be verified via a corresponding pig having a corresponding x-ray fluorescence sensor. X-ray fluorescence sensors have an increased measurement time of multiple seconds, however, at which they have to remain at the same point of a pipeline and are therefore not usable or are only usable with great effort for the utilization on conventional in-line inspection pigs, which are guided past on the pipeline. In the pig according to the invention, the pig can be braked or brought to a stop at least for the duration of an x-ray fluorescence measurement via the action of the seal element according to the invention. In this way, the pig according to the invention enables measurement methods to be used, the measurement duration of which obstructed usage on conventional in-line inspection pigs. A pig according to the invention thus enables the use of measurement methods having increased measurement times, for example, x-ray fluorescence analysis.

The pig preferably has a cleaning arrangement for cleaning a section of the pipeline wall to be analyzed by means of the x-ray fluorescence sensor. X-ray fluorescence analysis determines the composition of the analyzed material section. This measurement is corrupted by soiling or deposits on the surface of the pipeline wall. These are therefore to be removed in preparation. This can be carried out via a corresponding cleaning arrangement. Such a cleaning arrangement can have, for example, a rotating brush, which is brought into contact with the section of the pipeline wall to be analyzed and cleans it of deposits. The brush can have bristles made of a suitable steel and/or polymer.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Individual features of the exemplary embodiments described hereinafter can, in combination with the features of the independent claims, also result in refinements according to the invention.

Figure 1:
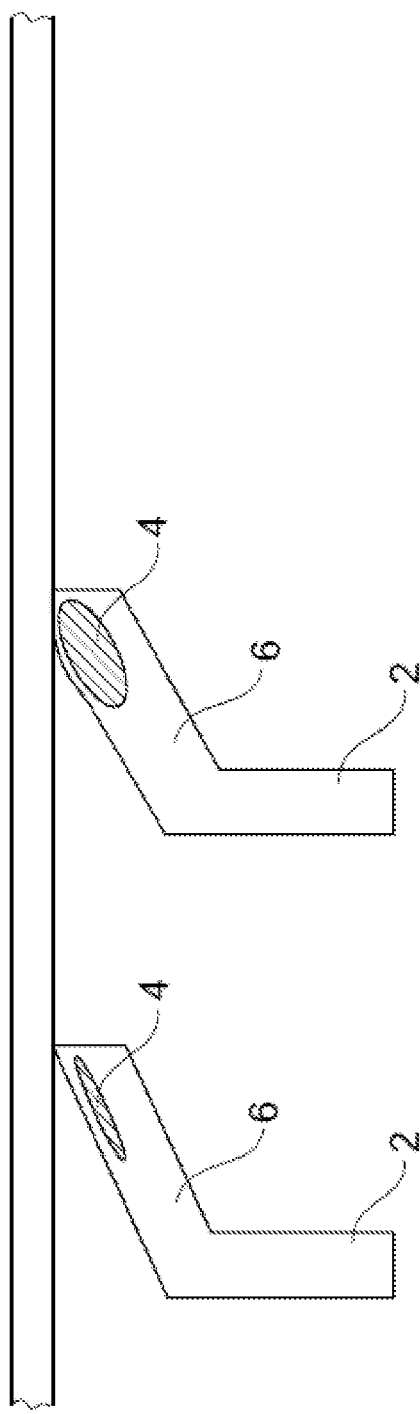
FIG. 1 shows an embodiment of a seal element according to the invention in the form of a seal cup.

FIG. 1 shows two seal elements 2 in the form of seal cups having a seal region 6 in the form of a truncated cone, more precisely in the form of a truncated cone jacket. The seal element 2 has a ring-shaped hollow body 4 at an outer end of the region in the form of a truncated cone, that is to say the region which is closest to the pipeline during use on a pig. This can be formed either by the introduction of an elastic hollow body into the seal element 2, for example during the production, or by the material of the seal element 2 itself. The seal element 2 itself is manufactured from a flexible, preferably elastomeric material. The ring-shaped hollow body 4 can be filled with a fluid. Instead of one ring-shaped hollow body 4, multiple hollow bodies arranged adjacent to one another and preferably in the form of circular ring segments can also be used. The filling of the hollow body 4 with a fluid causes a movement of the seal region 6 of the seal element 2 outward in the radial direction due to the ring-shaped arrangement of the hollow body 4. In this way, the seal element 2 is brought into contact with its seal region 6 on the inner wall of the pipeline upon use on a pig in a pipeline. If the seal element 2 already presses against the inner wall of a pipeline, the contact pressure of the seal element 2 on the pipeline can be increased by introducing a fluid into the hollow body 4. The fluid can be a gaseous or a liquid medium.

Figure 2:
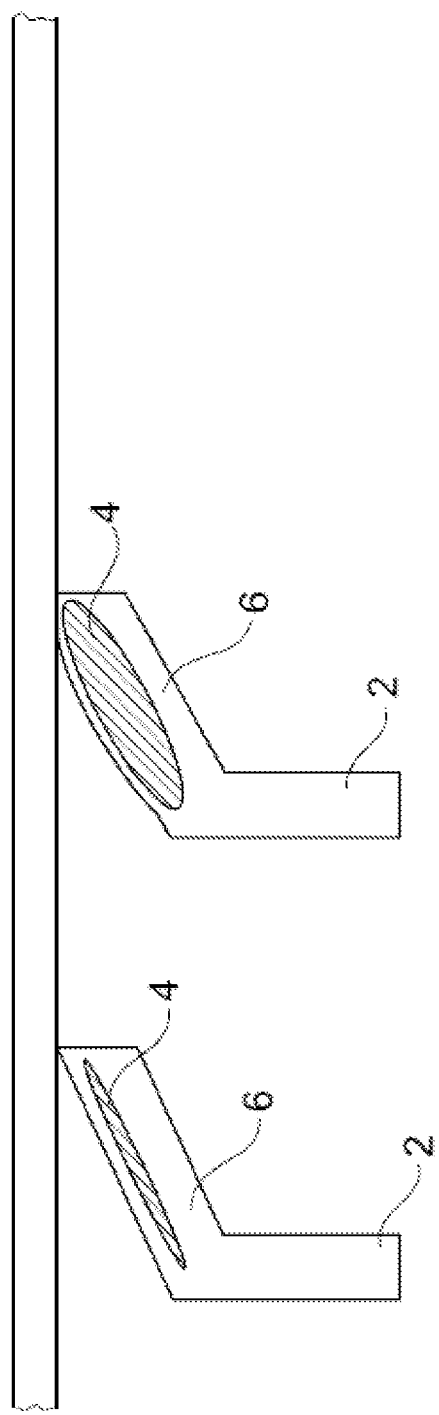
FIG. 2 shows a further embodiment of a seal element according to the invention in the form of a seal cup.

FIG. 2 describes a seal element 2 similar to FIG. 1, wherein the ring-shaped hollow body 4 extends nearly completely through the section 6 in the form of a truncated cone of the seal element 2. Due to the change of the location or the extension of the hollow body 4 in the seal element 2, the shape of the seal element 2 which results upon filling of the hollow body with a fluid can be varied and adapted to the corresponding application.

Figure 3:
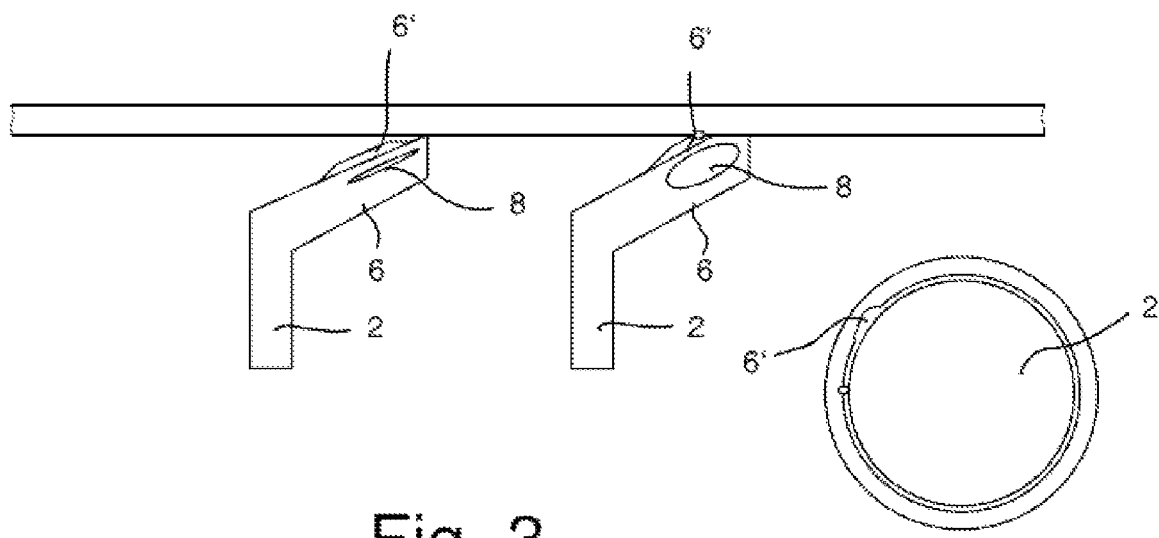
FIG. 3 shows a further embodiment of a seal element according to the invention in the form of a seal cup having material of differing hardness.

FIG. 3 shows a seal element 2 similar to the seal element according to FIG. 1. In this exemplary embodiment, the seal element is manufactured from two components, wherein the region 6' on the section in the form of a truncated cone is manufactured from a softer material than the remainder of the seal element 2. In this way, a better seal in relation to the inner wall of the pipeline is enabled, in particular if this inner wall is damaged as a result of corrosion, mechanical damage, or for other reasons. The section 6' manufactured from a softer material can cling better at or in the damaged points of the inner wall of the pipeline than a seal element 2 manufactured from a hard material. The harder material, from which the remainder of the seal element 2 is manufactured, provides the seal element 2 with the required mechanical stability.

Figure 4:
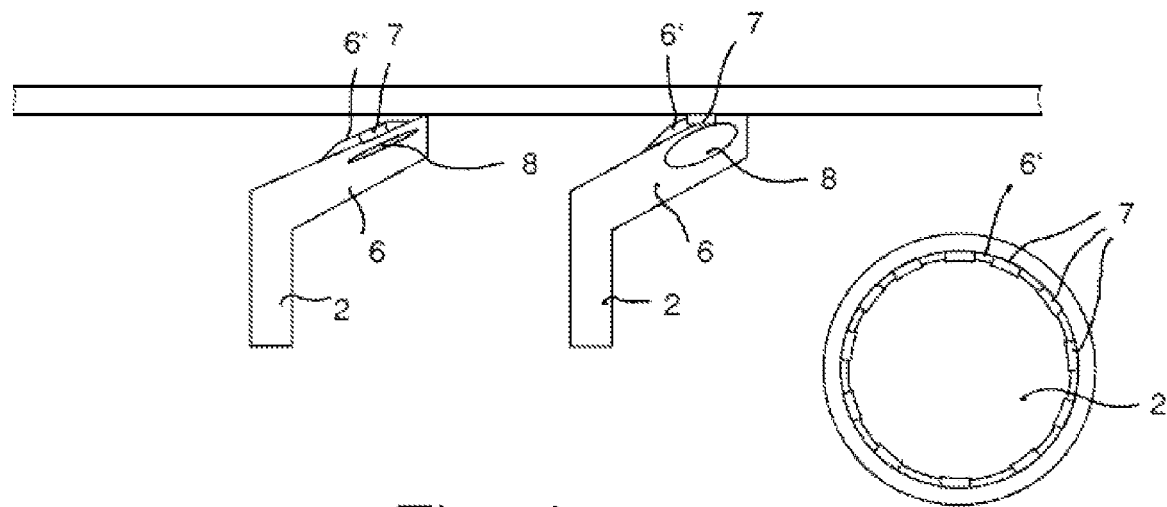
FIG. 4 shows a further embodiment of a seal element according to the invention in the form of a seal cup having metallic friction reinforcement elements.

FIG. 4 shows a seal element 2 similar to the seal element according to FIG. 3. In this exemplary embodiment, additional metal rods 7 are arranged in the region 6'. These metal rods 7 preferably have a rough metallic surface which can be brought into contact with the inner wall of the pipeline. The friction between the seal element 2 and the inner wall of the pipeline is increased in this way. A seal element 2 designed in this way has an improved braking action. The speed of a pipeline pig provided with such a seal element 2 in a pipeline can be controlled in an improved manner.

Figure 5:
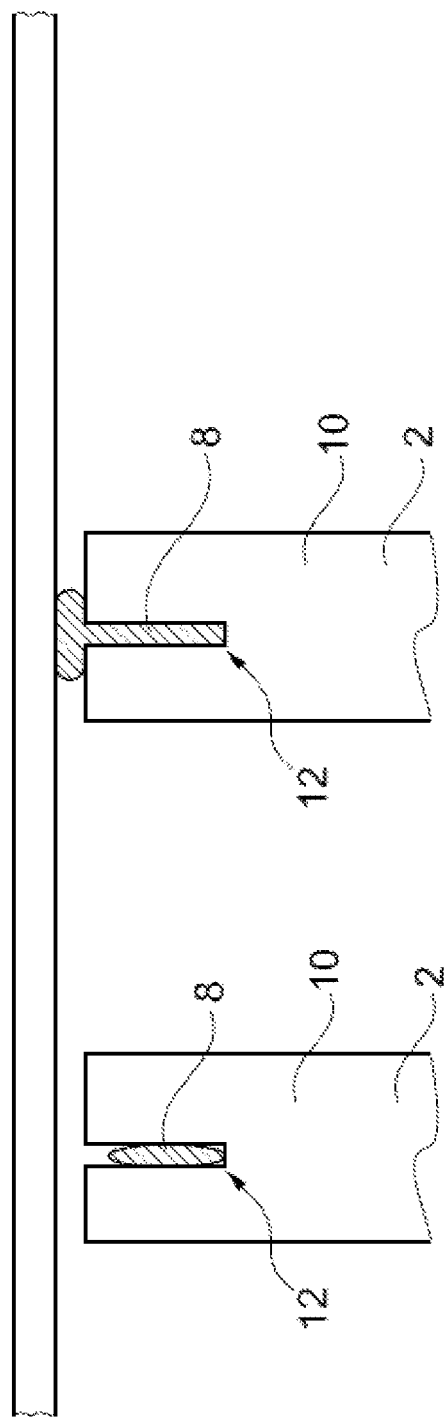
FIG. 5 shows an embodiment of a seal element according to the invention in the form of a guide disk.

FIG. 5 shows an alternative embodiment of a corresponding seal element 2 in the form of a guide disk 10. Such guide disks 10 for pigs are known from the prior art. In the exemplary embodiment according to FIG. 5, a circumferential groove 12 is introduced on the outer edge in the guide disk 10. A ring-shaped elastic hollow body 8, for example a hose, is introduced into this groove 12. A fluid can be introduced into the hollow body 4, whereby it can be expanded in such a way that it can be brought into contact with a pipeline wall. A sealing action is achieved in this way. The seal surface is formed here by the elastic hollow body 8. The advantage of this embodiment is that in the event of damage to the seal region, only the elastic hollow body 8 has to be replaced and the guide disk 10 can be used further.

Figure 6:
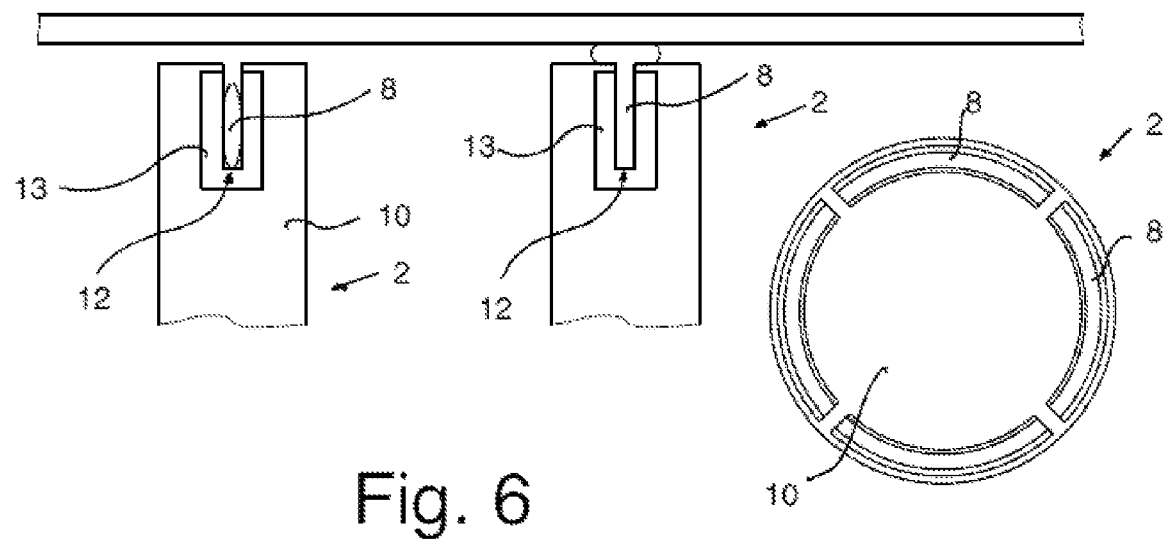
FIG. 6 shows an embodiment of a seal element according to the invention in the form of a guide disk.

FIG. 6 shows an alternative embodiment of a seal element 2 according to FIG. 5. Multiple grooves 12, which are not formed circumferentially, are applied on the circumference in the guide disk 10. An elastic hollow body 8, which is also not formed circumferentially, is introduced into each of these grooves 12. The grooves 12 are at least partially enclosed here by metallic groove bodies 13. The grooves 12 are reinforced in this way and the space for the expansion of the elastic hollow body 8 in the guide disk 10 is delimited more effectively. The expansion of the elastic hollow bodies 8 in the direction of an inner wall of a pipeline and thus the sealing action of such a seal element 2 is improved. The guide disk 10 has four segments, with each of which one elastic hollow body 8 is associated. Another number of segments, such as 2, 3, 5, 6, 7, or more segments is also conceivable. The elastic hollow bodies 8 of the individual segments can be filled individually and differently. The contact pressure on the inner wall of a pipeline can be adjusted segment by segment in this way. Moreover, in the event of damage to an elastic hollow body 8 of one segment, the elastic hollow bodies 8 of the other segments can still be brought into contact on the inner wall of the pipeline. Such a seal element 2 is thus more reliable. Furthermore, the maintenance and/or repair is facilitated since only the damaged elastic hollow body 8 has to be replaced.

Figure 7:
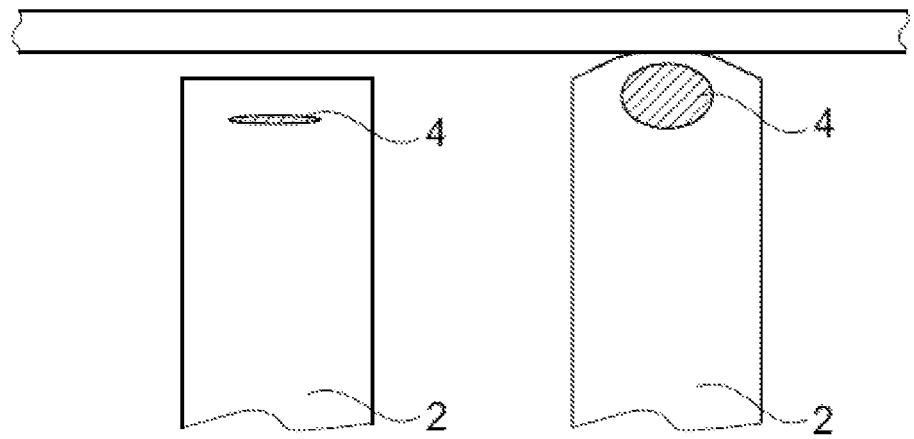
FIG. 7 shows an alternative embodiment of a seal element according to the invention in the form of a guide disk.
Figure 8:
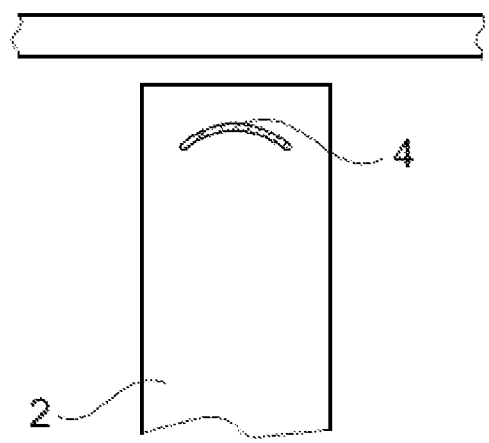
FIG. 8 shows a further alternative embodiment of the seal element in the form of a guide disk.

FIG. 7 and FIG. 8 show a seal element 2 according to the invention in the form of a guide disk 10, wherein the ring-shaped hollow body 4 is introduced into the guide disk 10. The hollow body 4 can be formed by an elastic hollow body 8, which is introduced into the seal element 2 during the production. Alternatively, the hollow body 4 can also be formed by the seal element 2 itself, in the form of a guide disk 10 here. The guide disk 10 can again be deformed by filling the hollow body 4 with a fluid and can be brought into contact on a pipeline wall when used on a pipeline pig. The seal element 2 according to FIG. 7 differs due to the arrangement of the hollow body 4 in the seal element 2 from the seal element according to FIG. 7. The shape which results upon filling of the hollow body 4 with a fluid can be adapted to the respective application by the change of the arrangement of the hollow body 4.

Figure 9:
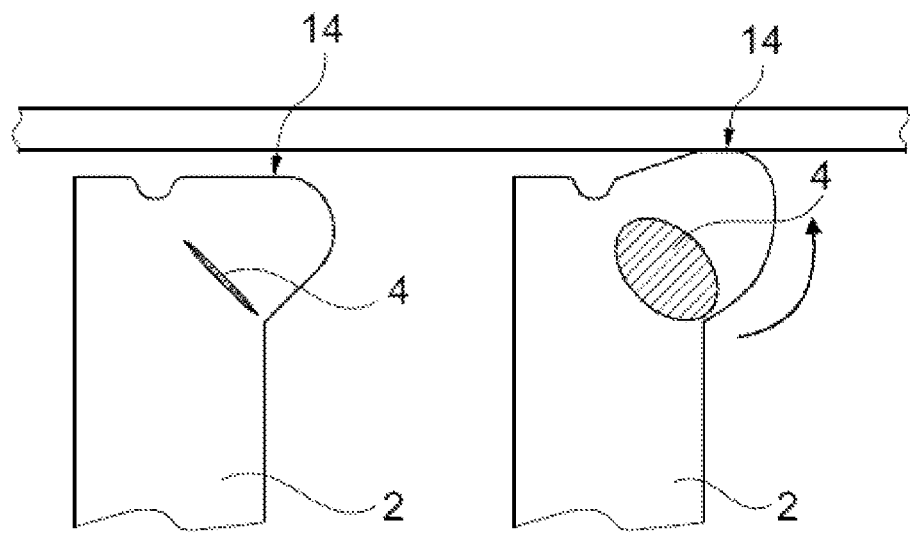
FIG. 9 shows an alternative embodiment of a seal element according to the invention in the form of a guide disk having a circumferential bead.
Figure 10:
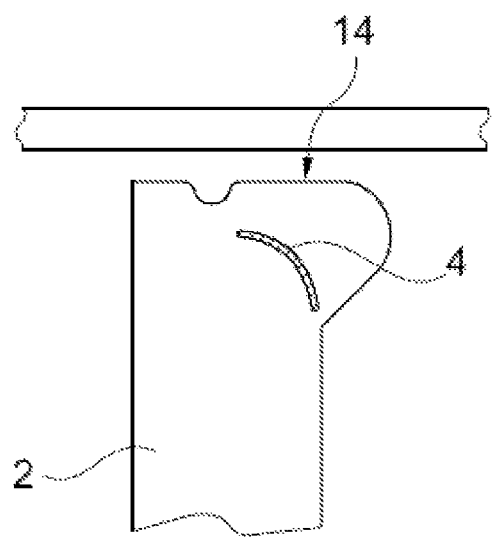
FIG. 10 shows an alternative embodiment of a seal element in the form of a guide disk.

FIG. 9 and FIG. 10 show seal elements 2 in the form of a guide disk 10, wherein the guide disk 10 has seal surfaces 14, which are formed by circumferential beads of the guide disk 10 protruding at the outer end in the movement direction of the pig. The circumferential beads represent a type of wear pad here, due to which a correspondingly designed seal element 2 can be in use longer. The ring-shaped hollow body 4 is again either formed by an elastic hollow body 8 introduced into the seal element 2 or by the material of the seal element 2 itself. The hollow body 4 is arranged so that upon filling of the hollow body 4 with a fluid, the bead is brought into contact on the pipe wall. The embodiment according to FIG. 10 differs from the embodiment according to FIG. 9 due to the arrangement of the hollow body 4 in the seal element 2. Special shapes of the seal element 2 upon filling of the hollow body 4 with a fluid can be achieved in this way. The correspondingly obtained shape can thus be adapted to the planned intended use of the seal element 2.

Figure 11:
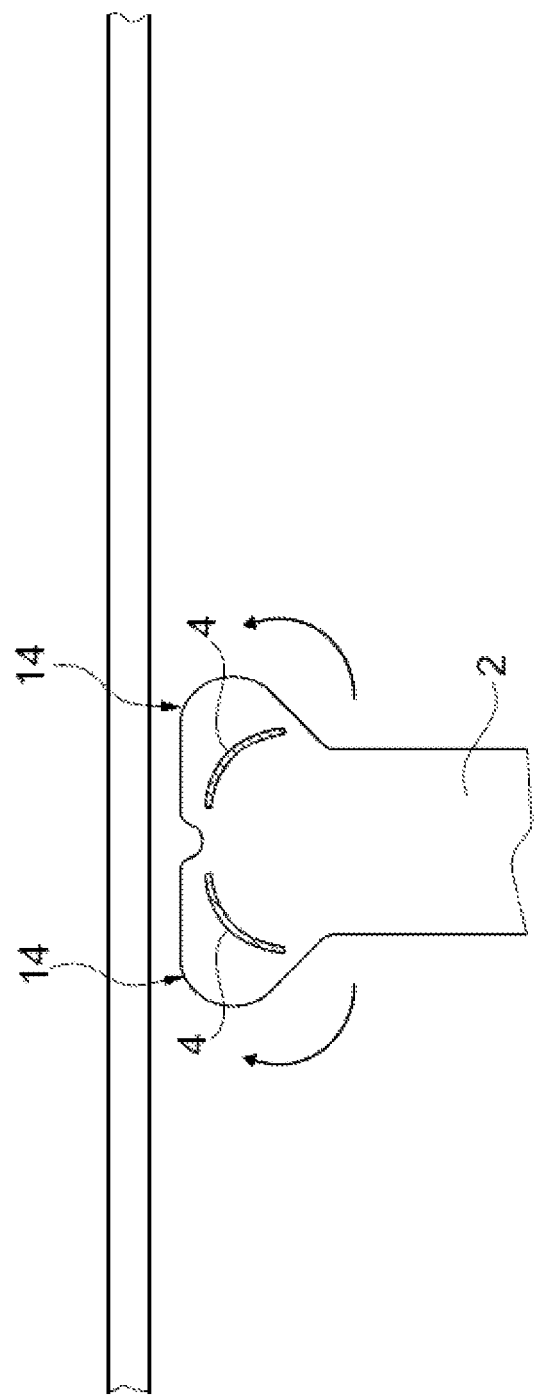
FIG. 11 shows a refinement of a seal element according to the invention according to FIG. 10 having two circumferential beads arranged opposite.

FIG. 11 shows a refinement of a seal element according to FIG. 10 or FIG. 9 having two circumferential beads, which are arranged spaced apart from one another in the movement direction of a pig and opposite in the region of the outer circumference of the guide disk 10. A ring-shaped hollow body 4 is associated with each of these circumferential beads. The hollow bodies 4 can be filled with a fluid independently of one another. One of the two circumferential beads can be brought into contact on a pipeline in this way. If necessary, both beads are also simultaneously brought into contact on a pipeline to thus obtain a double seal. The advantage of the seal element 2 according to FIG. 11 is that it is usable independently of the movement direction through the pipeline or independently of its installation direction. This facilitates the handling or usability of corresponding seal elements 2.

Figure 12:
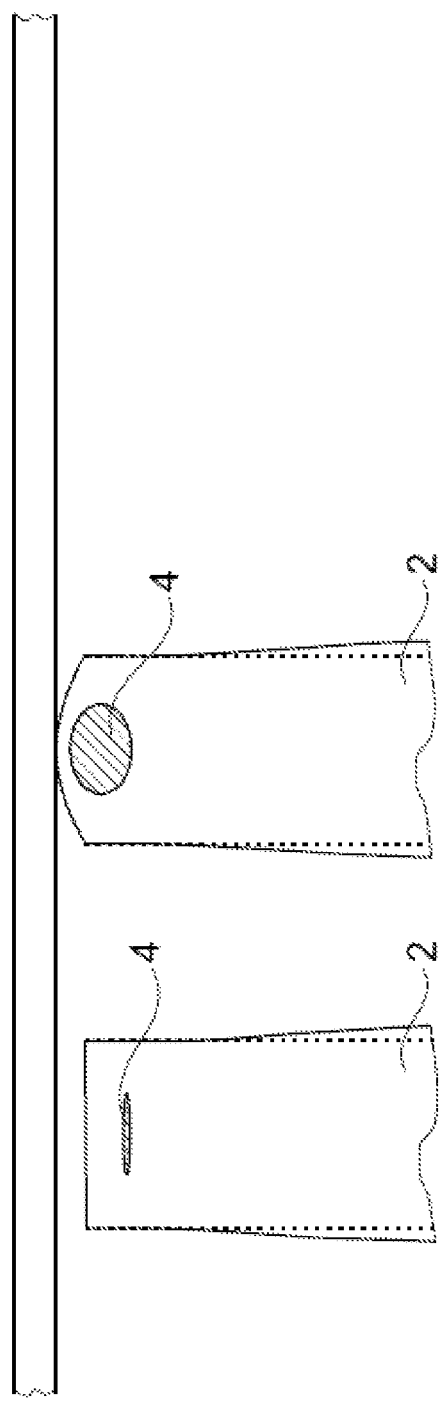
FIG. 12 shows a seal element according to the invention in the form of a guide disk having a trapezoidal cross section.

FIG. 12 shows a refinement of a seal element according to FIG. 7. The seal element is formed as a guide disk 10, wherein the guide disk according to FIG. 12 has a trapezoidal cross section. In this way, the material use for a corresponding guide disk 10 is reduced with equal stability or a more stable guide disk 10 is implemented with equal material use. The trapezoidal cross section in particular prevents bending of the guide disk 10. The trapezoidal shape of the guide disk can also be used with any other exemplary embodiments of a corresponding seal element 2 in the form of a guide disk 10, thus with other exemplary embodiments of FIG. 8, FIG. 9, FIG. 10, and FIG. 11.

Figure 13:
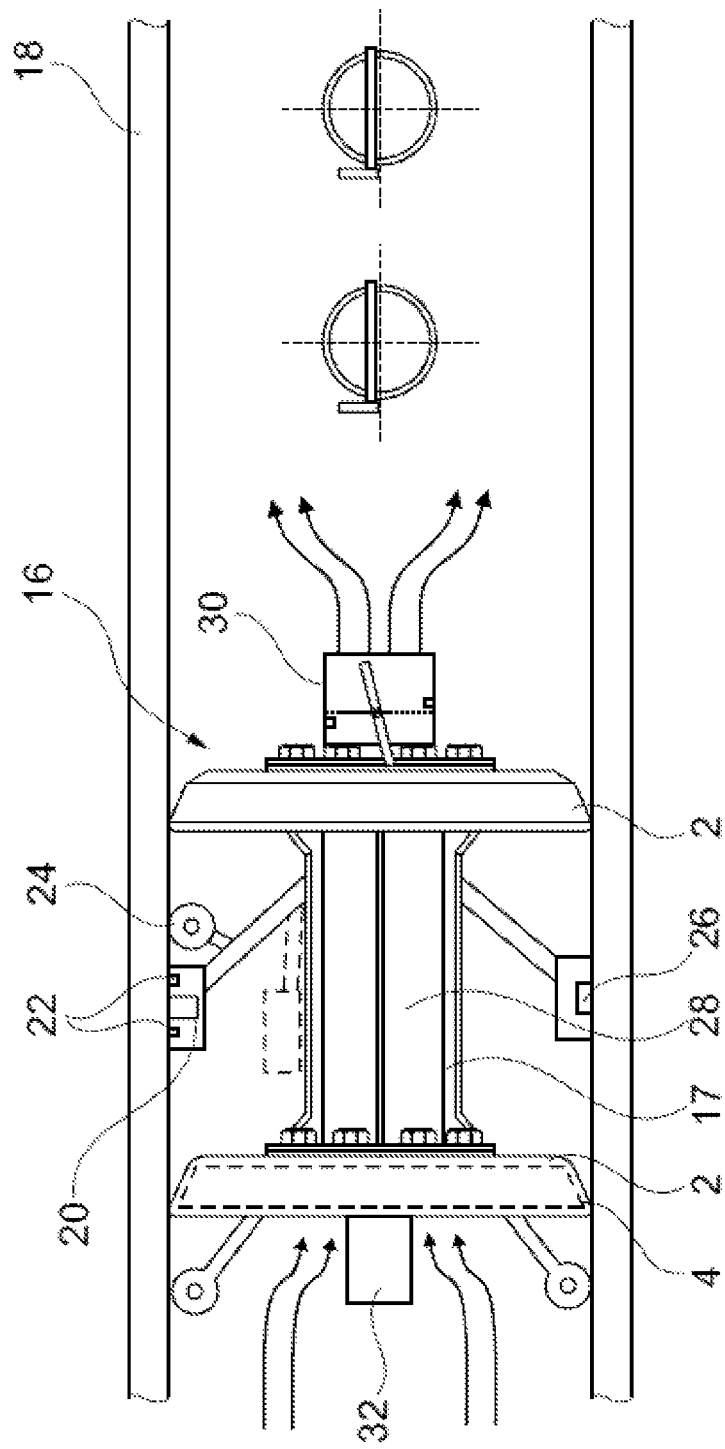
FIG. 13 shows a pig having a seal element according to the invention.

FIG. 13 shows a corresponding pig 16 having seal elements 2 according to the invention in a pipeline 18. The pig of this exemplary embodiment is equipped with a sensor which makes it necessary to stop the pig in a pipeline. A seal element 2 according to the invention is used to enable or assist stopping of the pig in a pipeline.

Seal elements 2 according to the invention having a hollow body 4 are arranged on the pig. In the exemplary embodiment, the seal elements 2 partially form a brake arrangement. In the present exemplary embodiment, this comprises a seal element 2 which has a ring-shaped hollow body 4. Moreover, the brake arrangement comprises a hydraulic pump 32, using which the hollow body 4 of the seal element 2 can be filled with a fluid. In this way, the seal element 2 is brought into contact with the pipeline 18 and/or the pressure which the seal element 2 exerts on the pipeline 18 is adjusted. The pig 16 can be braked via the brake arrangement in the pipeline 18 and fixed at a point at which an x-ray fluorescence sensor 20 arranged on the pig 16 in the exemplary embodiment is to carry out a measurement. In addition to the seal elements 2 according to FIG. 2 shown in the exemplary embodiment, alternative embodiments of the seal element 2 according to FIG. 1 and/or according to FIG. 3 to FIG. 12 are also conceivable. A brake arrangement can additionally also comprise movable brake elements which can be brought into contact with the pipeline 18 and/or comprise drive elements by which the pig 16 is transported through the pipeline 18. These can be fluid drives such as propellers, impellers, or jet drives or also wheels or crawler tracks in contact with the pipeline 18. These can move the pig 16 through the pipeline 18, but also stop it at a specific point in the pipeline 18. The wheels or crawler tracks can have brakes for this purpose.

The pig 16 in the exemplary embodiment according to FIG. 1 has to be capable of stopping in the pipeline 18. In this way, it is made possible for the x-ray fluorescence sensor 20 to carry out a measurement on a specific section of the pipeline 18. The measurement by means of the x-ray fluorescence sensor 20 has an increased measurement time, during which the x-ray fluorescence sensor 20 has to remain at a point to be analyzed of the pipeline 18. The pig has a bypass system 28 having a bypass valve 30 for this purpose.

The pig body 17 has one or more continuous cavities extending in the longitudinal direction through the pig body 17, through which a fluid located in the pipeline 18 can pass through the pig body 17. This cavity or these cavities are closable via a bypass valve 30. The bypass valve 30 closes the cavities while the pig 16 is to be transported through the pipeline. When the pig 16 has reached a new section of the pipeline 18 or approaches a new position, at which a measurement is to take place by means of the x-ray fluorescence sensor 20, the bypass valve 30 is opened. The bypass valve 30 is embodied here in the present case having a round cross section and pivotable around a pivot axis, wherein the pivot axis is arranged asymmetrically on the valve body of the bypass valve 30. In this way, the bypass valve 30 is automatically closing under the action of a fluid flowing in the pipeline 18. The bypass valve 30 is open and closed by motor in the normal case. In the event of a failure of the drive of the bypass valve 30, the bypass valve 30 is brought into a closed position by the fluid flowing in the pipeline 18 and the pig 16 is discharged from the pipeline.

In the present exemplary embodiment, the x-ray fluorescence sensor 20 is fixed on a pivotable arm, which is movable from a transport position shown by dashed lines, at which it presses against a pig body 17 of the pig 16, and a measurement position, in which the x-ray fluorescence sensor 20 presses against the pipeline 18. Two proximity sensors 22 are arranged adjacent to the x-ray fluorescence sensor 20. These sensors 20, 22 are introduced together into a sensor receptacle. In a measurement position, the proximity sensors 22 press against the pipeline 18. The proximity sensors 22 are designed here so that the x-ray fluorescence sensor 20 having the source provided there for high-energy x-ray radiation can only be activated when the proximity sensors 18 press against a measurement object, in the present case the pipeline 20. In the exemplary embodiment, a cleaning arrangement 24 is arranged on the pivotable arrangement. In the present case, this is designed as a brush that can be put into rotation having a drive. The brush can be designed here as a wire brush having steel bristles or polymer bristles. The cleaning arrangement 24 can also be implemented using other alternative cleaning means, however. These can be nozzles for this purpose, which apply a cleaning liquid to the section to be examined and/or blow the section free using a gas flow. Devices which wipe or suction off the section are also conceivable. The cleaning arrangement 24 is used to free a section of the pipeline 18, at which a measurement is to be carried out by the x-ray fluorescence sensor 20, of deposits and/or soiling.

In the exemplary embodiment, the pig 16 has a position determination unit 26, which is designed in the form of a weld seam detector. The weld seam detector detects circumferential weld seams, using which individual sections of a pipeline are connected. For complete analysis of the respective steel qualities used in a section, the pig 16 can thus effectuate a measurement by the x-ray fluorescence sensor 20 after each detection of a circumferential weld seam by means of the position determination unit 26. Therefore, when traversing the pipeline, each segment is analyzed at least once in succession and the steel quality used there is determined. It is also conceivable to carry out multiple measurements which are performed in sections spaced apart from one another in each section. A position determination unit 26 can alternatively or also additionally have an odometer and/or a sensor for signals transmitted through the pipeline 18.

The invention claimed is:

1. A seal element for a pipeline pig, which is transferable from a propulsion position into a sealing position, in which the seal element presses against an inside of a pipeline wall, the seal element comprising:
    at least one hollow body, which can be filled with fluid and emptied, whereby the seal element is transferable between the propulsion position and the sealing position;
    wherein the seal element has a guide disk;
    wherein the guide disk is at least partially formed from an elastic material and the ring-shaped hollow body is arranged in an elastic section of the guide disk or is formed thereby;
    wherein the guide disk has two circumferential beads arranged opposite to one another, which each at least partially co-form a seal section, and two ring-shaped hollow bodies, wherein the hollow bodies can be filled independently of one another and are arranged so that the seal sections are each movable radially outward independently of one another by filling one of the hollow bodies.

2. The seal element as claimed in claim 1, wherein the guide disk has a trapezoidal cross section.

3. A pig comprising:
    a pig body,
    at least one seal element as claimed in claim 1, and
    a fluid line arrangement comprising a fluid pump, via which the hollow body of the seal element can be filled with a fluid.

4. The pig as claimed in claim 3, further including at least one first seal element arranged adjacent to a first end of the pig body and at least one second seal element arranged adjacent to a second end of the pig body.

5. The pig as claimed in claim 3, wherein the fluid pump is a liquid pump.

6. The pig as claimed in claim 3, wherein the pig has a position determination unit for positioning the pig in the pipeline.

7. The pig as claimed in claim 6, wherein the position determination unit comprises at least one of an odometer, a weld seam detection arrangement, and a signal receiver for positioning signals transmitted through the pipeline wall.

8. The pig as claimed in claim 3, further including a bypass system having a bypass valve, through which a fluid flowing in the pipeline is conducted through the pig and/or past the pig.

9. The pig as claimed in claim 8, wherein the bypass valve can be subjected to a force moving the bypass valve in the direction of a closed position by a fluid flowing in the pipeline.

10. The pig as claimed in claim 9, wherein the bypass valve is pivotably mounted around a pivot axis, wherein the bypass valve is formed asymmetrically around the pivot axis and is arranged on the pig so that the larger part of the bypass valve can be subjected to a force moving the bypass valve in the direction of the closed position by a fluid flowing in the pipeline.

11. The pig as claimed in claim 3, wherein the pig has an x-ray fluorescence sensor.

12. The pig as claimed in claim 11, wherein the pig has a cleaning arrangement for cleaning a section of the pipeline wall to be analyzed by means of the x-ray fluorescence sensor.

* * * * *